United States Patent
Grover

[11] Patent Number: 5,988,175
[45] Date of Patent: Nov. 23, 1999

[54] METHOD FOR VOICE EVALUATION

[76] Inventor: Mary C. Grover, 15538 Covello St., Van Nuys, Calif. 91406-3341

[21] Appl. No.: 09/056,883

[22] Filed: Apr. 9, 1998

Related U.S. Application Data

[60] Provisional application No. 60/066,321, Nov. 21, 1997.

[51] Int. Cl.⁶ .................................................. A61B 19/00
[52] U.S. Cl. ................................................................ 128/898
[58] Field of Search ................................... 128/897, 898; 600/300, 586; 704/207, 271

[56] References Cited

U.S. PATENT DOCUMENTS

| | | | |
|---|---|---|---|
| 3,760,108 | 9/1973 | Gacek et al. | 704/271 |
| 4,093,821 | 6/1978 | Williamson | 704/207 |
| 5,008,942 | 4/1991 | Kiluchi | 704/270 |

*Primary Examiner*—Samuel Gilbert
*Attorney, Agent, or Firm*—Beehler & Pavitt; David A. Belasco; William H. Pavitt, Jr.

[57] ABSTRACT

A method for voice evaluation having three analysis steps is described. First, the subject is caused to stand with the arms at the sides and produce a yawn-sigh-like sound ("AH") without vibrato for approximately one second. The subject is instructed to begin the sound fairly high on the vocal scale, using the light mechanism of the voice, and to gradually lower (descend) the pitch of the tone in a smooth sliding/glissando effect. The tone descends through the middle voice and down through the chest voice or heavy mechanism of the voice, ending on the lowest tone that the subject can produce. The analyst listens to the quality of the descending tone evaluating it for clarity across the vocal scale and listening for disturbances in the quality, registration, resonance and placement of the tone, as well as a skip/interruption in the tone, a flutter/shakiness, a double tone, or any other vocal aberration. Second, the subject is caused to turn the head to a first side, facing the shoulder, without turning the torso, thus inhibiting the functioning of the vocal cord on the side being faced and allowing the vocal cord on the opposite side to vibrate freely so that it may be examined. The subject is then instructed to produce a yawn-sigh-like sound as described under the first procedure and the analyst listens to the tone produced and evaluates it as described in the first analysis step. Third, the subject is instructed to turn the head to the opposite side, facing the opposite shoulder, without turning the torso. The subject is then caused to produce the yawn-sigh-like sound as described under the first procedure and the analyst listens to the tone produced and evaluates it as described above. The analyst then compares the tone produced by the subject when facing forward with the tone produced when facing to the first side and then when facing to the opposite side. The tones produced are then analyzed to determine the type, severity and location of bumps or protrusions, swellings, or irritations.

15 Claims, 1 Drawing Sheet

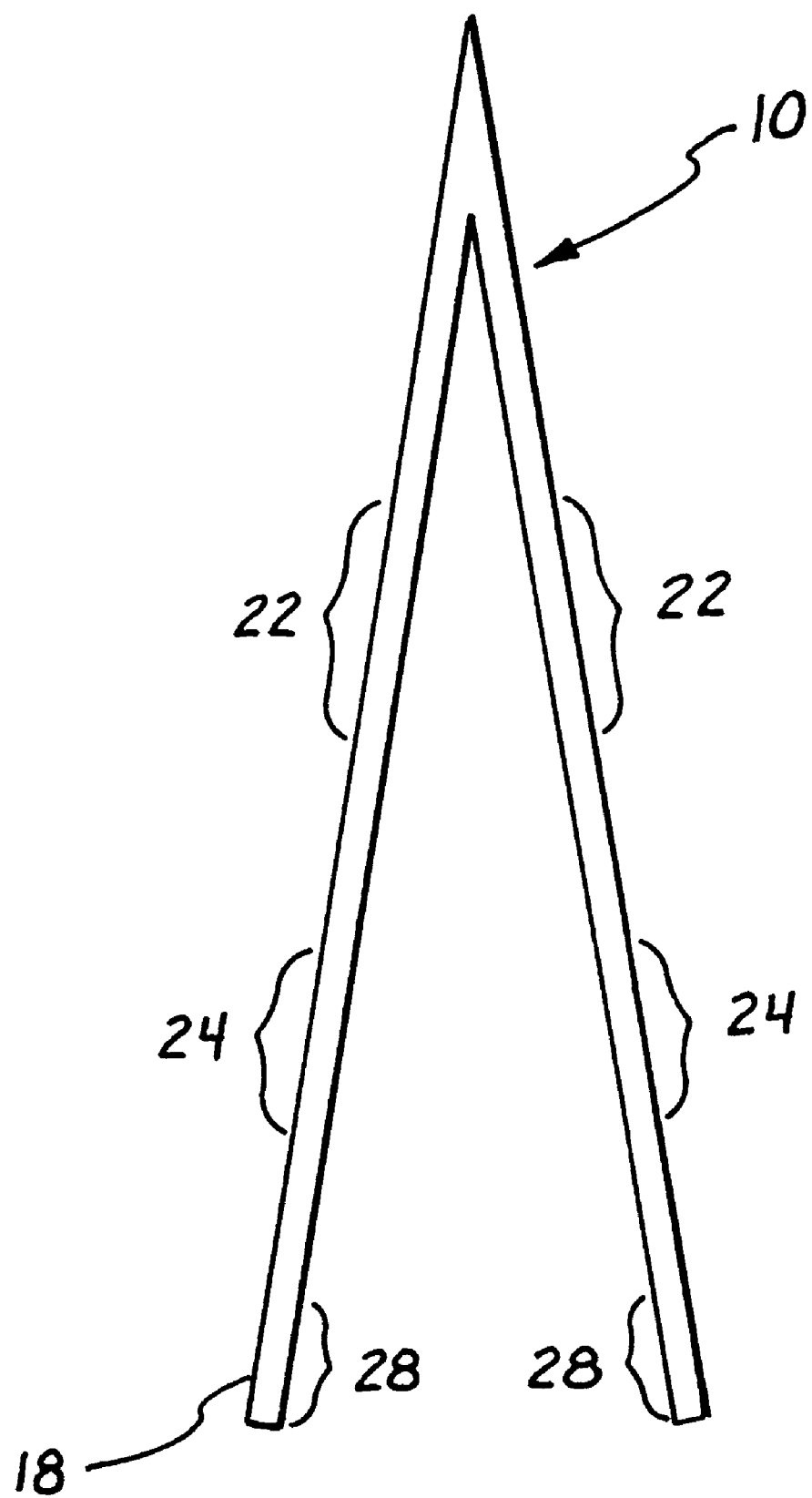

METHOD FOR VOICE EVALUATION

RELATED APPLICATION

This application is related to and claims priority from Provisional Application Serial No. 60/066,321, filed Nov. 21, 1997.

FIELD OF INVENTION

The invention pertains to field of human speech or voice quality. More particularly, the invention relates to methods for evaluating the quality and condition of the voice for purposes of designing exercises for the improvement of tonality and overall voice quality.

BACKGROUND OF THE INVENTION

Singers, orators, and others whose hobbies or livelihood depend upon the quality of their voice have long sought training and exercises to improve the quality and condition of their singing or speaking voice. It is well known that the vocal cords must be in good health and functioning properly in order for singer or speaker to produce a clear and dynamic vocal sound. It is also well known that many problems related to the vocal cords are caused by the presence of abnormalities or physical disturbances on the vocal cords that cause the vocal cords to deviate from normal functioning, thus resulting in a disturbance in the tone produced. These abnormalities or disturbances include bumps or protrusions extending outward on or around the approximating edge of the vocal cords, swelling within the vocal cords, or an irritation or disturbance of the tissues along or near the approximating edge of the vocal cords.

Exercises for the strengthening or enhancement of the voice are most effective when they can be designed to address particular informalities in the structure or condition of the vocal cords. When the location and severity of any bumps, protrusions, swellings or irritations can be precisely determined, a skilled voice trainer or speech therapist can design exercises to most effectively eliminate or minimize the problems caused by such conditions.

Inventions covered by the prior art which can be used to determine the condition of the vocal cords, identify and locate bumps, protrusions, swelling, irritations and other problems have typically involved invasive procedures. At a minimum, such inventions have included mirrors and lighting apparatus that are inserted into the throat of the person seeking voice evaluation. Other inventions include miniature video cameras, photographic instruments, and surgical procedures. It is well known that the use of such equipment, in such a sensitive area of the body, will often be less sensitive and less accurate and cause deviations in the evaluation itself. In addition, such procedures are time-consuming, expensive and at least irritating to the person undergoing them.

To date, none of the prior art inventions include methods to precisely determine the location of factors effecting the performance of the vocal cords without the use of artificial equipment which may often have deleterious effects upon the person whose voice is being evaluated.

SUMMARY OF THE INVENTION

The present invention addresses all of the deficiencies of prior art methods of voice evaluation and provides numerous other benefits. The method of the present invention is performed by auditory means rather than visually and measurements of the relative location of vocal cord abnormalities are described in terms of voice pitch. These pitch measurements are expressed in notes of the musical scale or in the corresponding measure of frequency known as Hertz or cycles per second. For example an "A" note above "middle C" has a frequency of 440 Hertz.

Sources of fixed pitch are often used by voice trainers, singing teachers and speech therapists to assist a subject to improve the quality and functioning of the voice by matching the sound she produces to a reference note or range of notes. Typical fixed pitch sources used in this manner include pitch pipes, tuning forks, pianos and other musical instruments, electronic tone generators and sound recordings.

An objective of the invention is to provide a means to isolate voice problems or abnormalities to one vocal cord or the other. A further objective of the invention is to determine the presence, general size and general location of any bumps, protrusions or other abnormalities on the vocal cords. A still further objective is to identify general swelling or swelling in specific areas of the vocal cords. Yet a further objective of the invention is to determine if an irritation results from a medical condition, a transition or register break or from a prior vocal cord surgery. Another objective is to provide a method for determining the relative strength of the vocal cords with respect to one another.

Yet another objective of the invention is to provide a method for determining that an abnormality has developed on one vocal cord and not the other or that one vocal cord might be weaker than the other. Still another objective of the invention is to provide a method for analysis of the connection between breath and the tone of the voice to give information regarding the glottic closure and the functioning and the use of the total vocal mechanism. This analysis permits the voice teacher or speech therapist to determine the presence and location and in some cases the cause of the variation in the voice quality. This analysis also permits the determination of the production and presence of pressed, pushed or tense tones as well as permitting the analyst to evaluate the sufficiency of airflow.

A key feature or cornerstone of the method of the present invention is that it permits the analyst to isolate and examine each vocal cord separately. The method of the present invention includes three procedures each followed by an analysis step. In the first procedure, the subject for evaluation is instructed to stand with the arms at the sides and produce a yawn-sigh-like sound ("AH") without vibrato for approximately one second. The subject is instructed to begin the sound fairly high on the vocal scale, using the light mechanism of the voice, and to gradually lower (descend) the pitch of the tone in a smooth sliding/glissando effect. The tone descends through the middle voice and down through the chest voice or heavy mechanism of the voice, ending on the lowest tone that the subject can produce.

In the first analysis step, the voice teacher or speech therapist (analyst) listens to the quality of the descending tone. The analyst evaluates the tone for clarity across the vocal scale (high tones to low tones) and listens for disturbances in the quality (breathiness, raspiness or scratchiness), registration (disconnected falsetto), resonance (hypernasality) and placement of the tone (throatiness), as well as a skip/interruption in the tone, a flutter/shakiness, a double tone, or any other aberration.

In the second procedure, the subject is instructed to turn the head to the right, facing the right shoulder, without turning the torso. This inhibits or damps the functioning of the vocal cord on the side being faced, in this case the right vocal cord, and allows the vocal cord on the opposite side, in this case the left vocal cord, to vibrate freely so that it may be examined. The subject is then instructed to produce a yawn-sigh-like sound as described under the first procedure. In the second analysis step the analyst listens to the tone produced and evaluates it as described in the first analysis step.

In the third procedure, the subject is instructed to turn the head to the left, facing the left shoulder, without turning the torso. This inhibits or damps the functioning of the vocal cord on the side being faced, in this case the left vocal cord, and allows the vocal cord on the opposite side, in this case the right vocal cord, to vibrate freely so that it may be examined. The subject is then instructed to produce a yawn-sigh-like sound as described under the first procedure. In the third analysis step the analyst listens to the tone produced and evaluates it as described in the first analysis step.

The analyst then compares the tone produced by the subject when facing forward with the tone produced when facing to the right and then when facing to the left. The tones produced are then analyzed to determine the type, severity and location of bumps or protrusions, swellings, or irritations. When there is a bump or protrusion on the approximating edge of the vocal cord, e.g. nodule, polyp, hematoma, or granuloma, there is a skip or interruption in the tone. The tone may be followed by an aberration like a scratchy flutter or there may be a shaking or diplophonia effect. This shaking effect can be distinguished from the shaking associated with general tension in the voice, which has a more generalized shaking effect.

The location of the bump or protrusion can be determined based upon the location of the skip or interruption of the tone or the diplophonia (double tone) effect in the vocal scale. The skip or double tone may occur in the general transition area between the chest voice (heavy mechanism) to the head voice (light mechanism). Typically this transition is between a 220 Hertz "A" note and a 392 Hertz "G" note in men or typically between a 440 Hertz "A" note and a 784 Hertz "G" note in women. If the skip or double tone occurs in this range, the bump or protrusion is typically located at the posterior end of the anterior $1/3^{rd}$ of the vocal cord. This area is commonly known as the "singer's nodule". If the skip or double tone occurs in the middle register, the bump is generally in the middle $1/3^{rd}$ of the vocal cord. This area is commonly known as the area of the speaker's "nodule". Such a bump is typically a nodule, polyp, or hematoma.

When the skip or double tone occurs at the bottom of the vocal range, the bump or protrusion is typically located at the posterior end of the vocal cord and is typically a granuloma or contact ulcer. Also, the analyst's evaluation of the tones produced by the subject can be used to determine the relative size of bumps or protrusions. When there is a larger, discreet bump, there can be a definite skip/interruption or loss of tone, or diplophonia. This skip or interruption can be as much as an octave (8 tones) in breadth, or there can be a definite extensive diplophonia which may be heard when analyzing the vocal cords in different body positions. An effortful glottal shock attack is heard with an onset in the area of the bump.

The analyst can differentiate between a definite transition shift (a big shift between the head voice and the middle or chest voice) which can also sound like a skip in the tone, and a bump. A definite transition shift is an indication of weakness in the voice in the area of the shift. The difference between a noticeable transition shift and a bump is as follows: When the skip is caused by a transition shift, it can usually be made to smooth out quickly with use of a more tense vowel, for example "EE" or "AY". A bump will not smooth out under this change in sound unless it is very small.

When there is a medium sized bump, there is a smaller skip (2–5 tones) or a less extensive double tone, accompanied by a glottal shock attack with an onset in the area of the bump. If there is a very small or pinpoint bump or protrusion on a vocal cord there is generally a slight shaking or quiver in the tone and generally no skip or interruption in the tone.

In addition to evaluation of bumps or protrusions, the invention provides methods for determining the location and size of swellings of the vocal cords. If there is a bilateral swelling (swelling of both vocal cords) the analyst will notice a glottal shock attack (a loud slapping onset on initiation of the tone). The tone will be breathy and diffused without edge, and less forward, bright and clear. The tone will be more throaty, nasal, fuzzy, with possible pitch problems (flat or sharp). If the majority ($3/4^{th}$ or more) of each vocal cord is swollen, the glottal shock attack will be the about same throughout the vocal range.

If there is a unilateral swelling (swelling of one vocal cord) the analyst will have the subject turn the head to each side and produce repeated staccato (short) tones on "AH" or "EE" on a single pitch (e.g. AH, AH, AH). This procedure is repeated on various pitches. The analyst then listens for glottal shock attack on each vocal cord. If greater glottal shock attack and greater effort is heard in one area than another, greater swelling is expected in the areas of greater glottal attack and greater effort.

In determining the relative size of the subject's swelling of the vocal cords, the following criteria are applied by the analyst. If a slight glottal attack is heard, a slight swelling will be present. If a medium swelling exists, a bigger glottal shock attack is heard. If a large swelling exists, the voice will be very heavy and it will be difficult and great effort for the subject to onset the tone. With swelling, there will be a diffusion of tone, and the tone will be weaker. The tone will sound less forward and bright, and the tone will be softer, more throaty, nasal and dull or breathy, with glottal shock attack at onset of tone. If one vocal cord is swollen and the other is normal or atrophied, there may be a weak glottic closure, with diplophonia as well as roughness, harshness, hoarseness or breathiness of the tone due to irregular vibratory patterns and weak glottic closure.

The methods of the present invention may also be used to analyze various vocal cord irritations. When stomach acids flow up from the stomach into the laryngeal area (Gastroesophageal Reflux Disorder), this can irritate or burn the vocal cords and cause the throat (pharynx) to constrict and the vocal tone to be disturbed and less clear. With a mild irritation the sound may be raspy and breathy. With greater irritation, the sound can be gravelly, harsh and guttural in the area that is irritated. When acid reflux is present, the area of irritation is generally in the posterior $1/3^{rd}$ of the vocal cord, but the entire vocal cord could be affected. There is generally some swelling of the vocal cords when irritated by acid reflux.

Prior to surgery, the vocal cords may not have been responding optimally if the voice was produced with an aberration such as a polyp in or on the vocal cords. A compensatory vibratory pattern of voice will usually develop. Following surgery, there is typically some irregularity and irritation of the vocal cords. The tissue (outer cover layer and possibly the muscle) where the aberration was removed may have been irritated or disturbed. The analyst will use the following criteria when evaluating the irritation. There may be a disturbance in registration. In the upper register, there may be a falsetto or squeaky tone, indicating that the vocal cords are not responding normally with reduced airflow. There may be a loss of vibration of the outer cover layer of the vocal cords. There will be a weakness in the tone due to the compensatory vibratory pattern that may have developed post-surgery, with disturbance of the tissues.

A second key feature or cornerstone of the method of the present invention is that it permits the analyst to determine which vocal cord is weaker or stronger. This is based on the relative effort of tone production. To do this, the analyst listens to the production, ease and quality of the tones. The analyst then simply asks the subject to determine which side the tone is more easily produced. An indication of difficulty in producing the tone on one side or the other will coincide with weakness of the vocal cord on the side opposite the side where difficulty is experienced. The analyst can teach the subject to be aware of when the tone is labored or effortless, thus making the evaluation more accurate.

Other embodiments of the method of the present invention include six alternative body positions for more in-depth information. In the first alternative position, the subject is requested to raise the arms above the head, grasp the elbows with opposing hands and squeeze the head to squeeze the vocal cords together. This position may give greater clarity to the presenting problem by bringing the vocal cords closer together. The yawn-sigh-like tone is then produced with the head facing forward and then to the left and right sides.

In the second alternative position, the subject is requested to lie down in a supine position with arms at sides. The subject's head is elevated one to three inches and the lower legs and feet are elevated approximately 18 to 24 inches so that the lumbar area may rest more easily on the floor. The yawn-sigh-like tone is then produced with the head facing forward and then to the left and right sides.

In the third alternative position, the subject is requested to lie down in a supine position with the arms placed above the head. The subject then grasps the elbows with opposing hands and squeezes the head to squeeze the vocal cords together. The subjects head is elevated one to three inches and the subjects lower legs and feet are elevated approximately 18 to 24 inches so that the subject's lumbar area may rest more easily on the floor. This position may give greater clarity to the presenting problem by bringing the vocal cords closer together. The yawn or sigh-like tone is then produced with the head facing forward and then to the left and right sides.

In the fourth alternative position, the subject is requested to lie on their side and produce the yawn-sigh-like tone. When lying on the left side, for instance, the problems on the left vocal cord will become more prominent. When lying on the right side, the disturbances on the right vocal cord will become more prominent. This position helps open the respiration system and decreases restrictions in air flow.

In the fifth alternative position the subject is asked to lie prone with the stomach over the top of a resilient ball approximately 25 to 30 inches in diameter. The yawn-sigh-like tone is then produced with the head facing forward and then to the left and right sides. As the subject produces the requested tones in each of the alternative head and body positions, the analyst listens to the quality of the tone as it is descending from the higher range to the lower range. The analyst uses the methods described above to determine the type, location and magnitude of any disturbance or skip in the tone.

In the sixth alternative position the subject is asked to stand and bend over, placing the hands on the floor approximately two to three feet in front of the feet. The legs may be straight or slightly bent with the heels pressing downward. The hands and feet are approximately shoulder width apart. The head is pressed toward the knees. The yawn-sigh-like tone is then produced with the head facing forward and then to the left and right sides.

As the subject produces the requested tones in each of the alternative head and body positions, the analyst listens to the quality of the tone as it is descending from the higher range to the lower range. The analyst uses the methods described above to determine the type, location and magnitude of any disturbance or skip in the tone.

DESCRIPTION OF THE DRAWINGS

The FIGURE is a schematic front elevation representing a subject's vocal cords.

DETAILED DESCRIPTION OF THE PREFERRED EMBODIMENT

The FIGURE is a schematic of the vocal cords 10 as seen when viewing the front of the subject. A left vocal cord 14 and a right vocal cord 18 are illustrated. The method of the present invention is performed by auditory means rather than visually and measurements of the relative location of vocal cord abnormalities are described in terms of voice pitch. These pitch measurements are expressed in notes of the musical scale or in the corresponding measure of frequency known as Hertz or cycles per second. For example an "A" note above "middle C" has a frequency of 440 Hertz. Sources of fixed pitch are often used by voice trainers, singing teachers and speech therapists to assist a subject to improve the quality and functioning of the voice by matching the sound she produces to a reference note or range of notes. Typical fixed pitch sources used in this manner include pitch pipes, tuning forks, pianos and other musical instruments, electronic tone generators and sound recordings.

A key feature or cornerstone of the method of the present invention is that it permits the analyst to isolate and examine each vocal cord 14, 18 separately. The method of the present invention includes three procedures; each followed by an analysis step. In the first procedure, the subject for evaluation is instructed to stand with the arms at the sides and produce a yawn or sigh-like sound ("AH") without vibrato for approximately one second. The subject is instructed to begin the sound fairly high on the vocal scale, using the light mechanism of the voice, and to gradually lower the pitch of the tone in a smooth glissando effect. The tone is lowered through the middle voice to the chest voice or heavy mechanism of the voice, to the lowest tone that the subject can produce.

In the first analysis step, the voice teacher or speech therapist (analyst) listens to the quality of the descending tone. The analyst evaluates the tone for clarity across the vocal scale (high tones to low tones) and listens for disturbances in the quality (breathiness, raspiness or scratchiness), registration (disconnected falsetto), resonance (hypernasality) and placement of the tone (throatiness), as well as a skip/interruption in the tone, a flutter/shakiness, a double tone, or any other aberration.

In the second procedure, the subject is instructed to turn the head to the right, facing the right shoulder, without turning the torso. This inhibits or dampens the functioning of the vocal cord 14, 18 on the side being faced, in this case the right vocal cord 18, and allows the vocal cord 14, 18 on the opposite side, in this case the left vocal cord 14, to vibrate freely so that it may be examined. The subject is then instructed to produce a yawn-sigh-like sound as described under the first procedure. In the second analysis step the analyst listens to the tone produced and evaluates it as described in the first analysis step.

In the third procedure, the subject is instructed to turn the head to the left, facing the left shoulder, without turning the torso. This inhibits or dampens the functioning of the vocal cord 14, 18 on the side being faced, in this case the left vocal cord 14, and allows the vocal cord 14, 18 on the opposite side, in this case the right vocal cord 18, to vibrate freely so that it may be examined. The subject is then instructed to produce a yawn-sigh-like sound as described under the first procedure. In the third analysis step the analyst listens to the tone produced and evaluates it as described in the first analysis step.

The analyst then compares the tone produced by the subject when facing forward with the tone produced when facing to the right and then when facing to the left. The tones produced are then analyzed to determine the type, severity and location of bumps or protrusions, swellings, or irritations. When there is a bump or protrusion on the approximating edge of the vocal cord 14, 18, e.g. nodule, polyp, hematoma, or granuloma, there is a skip or interruption in the tone. The tone may be followed by an aberration like a scratchy flutter or there may be a shaking or diplophonia effect. This shaking effect can be distinguished from the shaking associated with general tension in the voice, which has a more generalized shaking effect.

The location of the bump or protrusion can be determined based upon the location of the skip or interruption of the tone or the diplophonia (double tone) effect in the vocal scale. The skip or double tone may occur in the general transition area between the chest voice (heavy mechanism) to the head voice (light mechanism). Typically this transition is between a 220 Hertz "A" note and a 392 Hertz "G" note in men or typically between a 440 Hertz "A" note and a 784 Hertz "G" note in women. If the skip or double tone occurs in this range, the bump or protrusion is typically located at the posterior end of the anterior $\frac{1}{3}^{rd}$ 22 of the vocal cord 14, 18. This area is commonly known as the "singer's nodule". If the skip or double tone occurs in the middle register, the bump is generally in the middle $\frac{1}{3}^{rd}$ 24 of the vocal cord 14, 18. This area is commonly known as the area of the speaker's "nodule". Such a bump is typically a nodule, polyp, or hematoma.

When the skip or double tone occurs at the bottom of the vocal range, the bump or protrusion is typically located at the posterior end 28 of the vocal cord 14, 18 and is typically a granuloma or contact ulcer. Also, the analyst's evaluation of the tones produced by the subject can be used to determine the relative size of bumps or protrusions. When there is a larger, discreet bump, there can be a definite skip/interruption or loss of tone, or diplophonia. This skip or interruption can be as much as an octave (8 tones) in breadth, or there can be a definite extensive diplophonia which may be heard when analyzing the vocal cords 10 in different body positions. An effortful glottal shock attack is heard with an onset in the area of the bump.

The analyst can differentiate between a definite transition shift (a big shift between the head voice and the middle or chest voice) which can also sound like a skip in the tone, and a bump. A definite transition shift is an indication of weakness in the voice in the area of the shift. The difference between a noticeable transition shift and a bump is as follows: When the skip is caused by a transition shift, it can usually be made to smooth out quickly with use of a more tense vowel, for example "EE" or "AY". A bump will not smooth out under this change in sound unless it is very small.

When there is a medium sized bump, there is a smaller skip (2–5 tones) or a less extensive double tone, accompanied by a glottal shock attack with an onset in the area of the bump. If there is a very small or pinpoint bump or protrusion on a vocal cord 14, 18 there is generally a slight shaking or quiver in the tone and generally no skip or interruption in the tone.

In addition to evaluation of bumps or protrusions, the invention provides methods for determining the location and size of swellings of the vocal cords 10. If there is a bilateral swelling (swelling of both vocal cords 10) the analyst will notice a glottal shock attack (a loud slapping onset on initiation of the tone). The tone will be breathy and diffused without edge, and less forward, bright and clear. The tone will be throatier, nasal, and fuzzy, with possible pitch problems (flat or sharp). If the majority ($\frac{3}{4}^{th}$ or more) of each vocal cord 14, 18 is swollen, the glottal shock attack will be the about the same throughout the vocal range.

If there is a unilateral swelling (swelling of one vocal cord 14, 18) the analyst will have the subject turn the head to each side and produce repeated staccato (short) tones on "AH" or "EE" on a single pitch (e.g. AH, AH, AH). This procedure is repeated on various pitches. The analyst then listens for glottal shock attack on each vocal cord 14, 18. If greater glottal shock attack and greater effort is heard in one area than another, greater swelling is expected in the areas of greater glottal attack and greater effort.

In determining the relative size of the subject's swelling of the vocal cords 10, the following criteria are applied by the analyst. If a slight glottal attack is heard, a slight swelling will be present. If a medium swelling exists, a bigger glottal shock attack is heard. If a large swelling exists, the voice will be very heavy and it will be difficult and great effort for the subject to onset the tone. With swelling, there will be a diffusion of tone, and the tone will be weaker. The tone will sound less forward and bright, and the tone will be softer, more throaty, nasal and dull or breathy, with glottal shock attack at onset of tone. If one vocal cord 14, 18 is swollen and the other is normal or atrophied, there may be a weak glottic closure, with diplophonia as well as roughness, harshness, hoarseness or breathiness of the tone due to irregular vibratory patterns and weak glottic closure.

The methods of the present invention may also be used to analyze various vocal cord 14, 18 irritations. When stomach acids flow up from the stomach into the laryngeal area (Gastroesophageal Reflux Disorder), this can irritate or burn the vocal cords 10 and cause the throat (pharynx) to constrict and the vocal tone to be disturbed and less clear. With a mild irritation the sound may be raspy and breathy. With greater irritation, the sound can be gravelly, harsh and guttural in the area that is irritated. When acid reflux is present, the area of irritation is generally in the posterior $\frac{1}{3}^{rd}$ 28 of the vocal cord, but the entire vocal cord 14, 18 could be affected. There is generally some swelling of the vocal cords 10 when irritated by acid reflux.

Prior to surgery, the vocal cords 10 may not have been responding optimally if the voice was produced with an aberration such as a polyp in or on the vocal cords 10. A compensatory vibratory pattern of voice will usually develop. Following surgery, there is typically some irregularity and irritation of the vocal cords 10. The tissue (outer cover layer and possibly the muscle) where the aberration was removed may have been irritated or disturbed. The analyst will use the following criteria when evaluating the irritation. There may be a disturbance in registration. In the upper register, there may be a falsetto or squeaky tone, indicating that the vocal cords 10 are not responding normally with reduced airflow. There may be a loss of vibration of the outer cover layer of the vocal cords 10. There will be a weakness in the tone due to the compensatory vibratory pattern that may have developed post-surgery, with disturbance of the tissues.

A second key feature or cornerstone of the method of the present invention is that it permits the analyst to determine which vocal cord 14, 18 is weaker or stronger. This is based on the relative effort of tone production. To do this, the analyst listens to the production, ease and quality of the tones. The analyst then simply asks the subject to determine which side the tone is more easily produced. An indication of difficulty in producing the tone on one side or the other will coincide with weakness of the vocal cord 14, 18 on the side opposite the side where difficulty is experienced. The analyst can teach the subject to be aware of when the tone is labored or effortless, thus making the evaluation more accurate.

Other embodiments of the method of the present invention include six alternative body positions for more in-depth information. In the first alternative position, the subject is requested to raise the arms above the head, grasp the elbows with opposing hands and squeeze the head to squeeze the vocal cords 10 together. This position may give greater clarity to the presenting problem by bringing the vocal cords 10 closer together. The yawn-sigh-like tone is then produced with the head facing forward and then to the left and right sides.

In the second alternative position, the subject is requested to lie down in a supine position with arms at sides. The subject's head is elevated one to three inches and the lower legs and feet are elevated approximately 18 to 24 inches so that the lumbar area may rest more easily on the floor. The yawn-sigh-like tone is then produced with the head facing forward and then to the left and right sides.

In the third alternative position, the subject is requested to lie down in a supine position with the arms placed above the head. The subject then grasps the elbows with opposing hands and squeezes the head to squeeze the vocal cords 10 together. The subjects head is elevated one to three inches and the subjects lower legs and feet are elevated approximately 18 to 24 inches so that the subject's lumbar area may rest more easily on the floor. This position may give greater clarity to the presenting problem by bringing the vocal cords 10 closer together. The yawn or sigh-like tone is then produced with the head facing forward and then to the left and right sides.

In the fourth alternative position, the subject is requested to lie on their side and produce the yawn-sigh-like tone. When lying on the left side, for instance, the problems on the left vocal cord 14 will become more prominent. When lying on the right side, the disturbances on the right vocal cord 18 will become more prominent. This position helps open the respiration system and decreases restrictions in air flow.

In the fifth alternative position the subject is asked to lie prone with the stomach over the top of a resilient ball approximately 25 to 30 inches in diameter. The yawn-sigh-like tone is then produced with the head facing forward and then to the left and right sides. As the subject produces the requested tones in each of the alternative head and body positions, the analyst listens to the quality of the tone as it is descending from the higher range to the lower range. The analyst uses the methods described above to determine the type, location and magnitude of any disturbance or skip in the tone.

In the sixth alternative position the subject is asked to stand and bend over, placing the hands on the floor approximately two to three feet in front of the feet. The legs may be straight or slightly bent with the heels pressing downward. The hands and feet are approximately shoulder width apart. The head is pressed toward the knees. The yawn-sigh-like tone is then produced with the head facing forward and then to the left and right sides.

As the subject produces the requested tones in each of the alternative head and body positions, the analyst listens to the quality of the tone as it is descending from the higher range to the lower range. The analyst uses the methods described above to determine the type, location and magnitude of any disturbance or skip in the tone.

I claim:

1. A method for voice evaluation having three analysis steps, comprising:

a first step of causing a subject for evaluation, said subject having arms, elbows, hands, a left side, a right side, a head, shoulders, a torso, legs, knees, feet, a stomach, a back, said back having a lumbar area, and a voice, to stand with the arms at the sides and produce a yawn-sigh-like tone ("AH") without vibrato for approximately one second;

having the subject begin to emit the tone fairly high on a vocal scale, using a light mechanism of the voice, and to have the subject gradually lower (descend) the pitch of the tone in a smooth sliding/glissando effect;

having the subject cause the emitting tone to descend through a middle voice and down through a heavy mechanism of the voice, ending in a bottom range on a lowest tone that the subject can produce;

listening to a quality of said descending tone;

evaluating the clarity of the tone across the vocal scale (high tone to low tone) while noting disturbances in the quality (breathiness, raspiness or scratchiness), registration (disconnected falsetto), resonance (hypernasality) and placement of the tone (throatiness), as well as a skip/interruption in the tone, a flutter/shakiness, a double tone, or any other tone aberration;

a second step of causing the subject to turn the head to a first side, facing the shoulder on that side, without turning the torso; thereby inhibiting/dampening the functioning of a vocal cord on the side being faced, and allowing a vocal cord on the opposite side, to vibrate freely so that it may be examined;

having the subject produce the yawn-sigh-like tone;

listening to the tone produced and evaluating it as described in the first analysis step;

a third step of causing the subject turn the head to the side opposite the first side, facing the shoulder, without turning the torso; thereby inhibiting the functioning of a vocal cord on the side being faced, and allowing the vocal cord on the opposite side, to vibrate freely so that it may be examined;

instructing the subject to produce the yawn-sigh-like tone;

listening to the tone produced and evaluating it as described in the first analysis step comparing the tone produced by the subject when facing forward with the tone produced when facing to the first side and with the tone produced when facing to the opposite side to determine the type, severity and location of bumps or protrusions, swellings, or irritations;

evaluating the tone produced according to the following standard:

when there is a bump or protrusion on an approximating edge of the vocal cord, e.g. nodule, polyp, hematoma, or granuloma, there is a skip or interruption in the tone, said tone may be followed by an aberration like a scratchy flutter or there may be a shaking or diplophonia effect, said shaking effect being distinguishable from the shaking associated with general tension in the voice, which shaking effect has a more generalized shaking nature;

determining the location of the bump or protrusion in the vocal scale based upon the location of the skip or interruption of the tone or the diplophonia (double tone) effect in the vocal scale;

evaluating the tone produced according to the following standard:

when the skip or double tone occurs in a general transition area between the chest voice (heavy mechanism) to the head voice (light mechanism) this transition is typically between a 220 Hertz "A" note and a 392 Hertz "G" note in men and the bump or protrusion is typically located at a posterior end of an anterior $\frac{1}{3}^{rd}$ of a vocal cord, said bump or protrusion being commonly known as the "singer's nodule";

when the skip or double tone occurs in the general transition area between the chest voice (heavy mechanism) to the head voice (light mechanism) this transition is typically between a 440 Hertz "A" note and a 784 Hertz "G" note in women and the bump or protrusion is typically located at a posterior end of an anterior $\frac{1}{3}^{rd}$ of the vocal cord, said bump or protrusion being commonly known as the "singer's nodule";

when the skip or double tone occurs in a middle register, the bump or protrusion is generally in a middle $\frac{1}{3}^{rd}$ of the vocal cord, said bump or protrusion is typically a nodule, polyp, or hematoma and such location being commonly known as the area of the "speaker's nodule"; and when the skip or double tone occurs at a bottom of the vocal range, the bump or protrusion is typically located at a posterior end of the vocal cord and is typically a granuloma or contact ulcer.

2. A method for voice evaluation having three analysis steps as described in claim 1, further comprising:

listening to the tones produced by the subject to determine the relative size of bumps or protrusions;

evaluating the tone produced according to the following standard:

when there is a definite skip/interruption or loss of tone, or diplophonia, said skip/interruption or loss of tone, or diplophonia being as much as an octave (8 tones) in breadth there is a larger, discreet bump and an effortful glottal shock attack is heard with an onset in the area of the bump;

when there is a definite extensive diplophonia which may be heard when analyzing the vocal cords in different body positions there is a larger, discreet bump and an effortful glottal shock attack is heard with an onset in the area of the bump;

when there is a smaller skip (2–5 tones) or a less extensive diplophonia, there is a medium sized bump and a smaller glottal shock attack is heard with an onset in the area of the bump; and when there is a slight shaking or quiver in the tone and generally no skip or interruption in the tone is heard, there is a very small or pinpoint bump or protrusion on a vocal cord.

3. A method for voice evaluation having three analysis steps as described in claim 1, further comprising:

listening to the tones produced by the subject to differentiate between a definite transition shift (a big shift between the head voice and the middle or chest voice) which can also sound like a skip in the tone, indicating a weakness in the voice in the area of the shift, and a bump or protrusion;

evaluating the tone produced according to the following standard:

when the skip is caused by a transition shift, it can usually be made to smooth out quickly with use of a more tense vowel, for example "EE" or "AY"; and when the skip is caused by a bump or protrusion it will not smooth out quickly with use of a more tense vowel, for example "EE" or "AY" unless the bump or protrusion is very small.

4. A method for voice evaluation having three analysis steps as described in claim 1, further comprising:

listening to the tones produced by the subject to determine the location of swellings of the vocal cords;

evaluating the tone produced according to the following standard:

when there is a bilateral swelling (swelling of both vocal cords) the analyst will notice a glottal shock attack (a loud slapping onset on initiation of the tone), said tone will be breathy and diffused without edge, and less forward, bright and clear, and more throaty, nasal, or fuzzy, with possible pitch problems (flat or sharp);

when the majority ($\frac{3}{4}^{th}$ or more) of each vocal cord is swollen, the glottal shock attack will be the about same throughout the vocal range;

when there is a unilateral swelling (swelling of one vocal cord) the analyst will have the subject turn the head to each side and produce repeated staccato (short) tones on "AH" or "EE" on a single pitch (e.g. AH, AH, AH), repeating the procedure on various pitches listening for glottal shock attack on each vocal cord; and when greater glottal shock attack and greater effort is heard in one area than another, greater swelling is expected in the areas of greater glottal attack and greater effort.

5. A method for voice evaluation having three analysis steps as described in claim 1, further comprising:

listening to the tones produced by the subject to determine the size of swellings of the vocal cords;

evaluating the tone produced according to the following standard:

when a slight glottal attack is heard, a slight swelling will be present;

when a bigger glottal shock attack is heard, a medium swelling will be present;

when the voice is very heavy and it is difficult and great effort is required for the subject to onset the tone, a large swelling will be present;

said swelling being characterized by a diffusion and weakness of tone, and sounding less forward and bright, softer, more throaty, nasal and dull or breathy, with glottal shock attack at onset of tone; and when one vocal cord is swollen and the other is normal or atrophied, there may be a weak glottic closure, with diplophonia as well as roughness, harshness, hoarseness or breathiness of the tone due to irregular vibratory patterns.

6. A method for voice evaluation having three analysis steps as described in claim 1, further comprising:

listening to the tones produced by the subject to analyze vocal cord irritations caused by acid reflux (Gastro-esophageal Reflux Disorder) into the laryngeal area;

evaluating the tone produced according to the following standard:

when the irritation is mild the tone may be raspy and breathy; and when the irritation is greater the tone can be gravelly, harsh and guttural in the area that is irritated.

7. A method for voice evaluation having three analysis steps as described in claim 1, further comprising:

listening to the tones produced by the subject to analyze vocal cord irritations resulting from surgery for an aberration such as a polyp in or on the vocal cords;

evaluating the tone produced according to the following standard:

when the subject produces a falsetto or squeaky tone, it indicates that the vocal cords are not responding normally with reduced airflow; and when there is a loss of vibration of the outer cover layer of the vocal cords there will be a weakness in the tone due to the compensatory vibratory pattern that may have developed post-surgery, with disturbance of the tissues.

8. A method for voice evaluation having three analysis steps as described in claim 1, further comprising:

listening to the ease and quality of the tones produced by the subject to determine which vocal cord is weaker or stronger;

teaching the subject to be aware of when tone production is labored or effortless;

asking the subject to determine on which side the tone is more easily produced; and evaluating the tone produced according to the following standard:

when the subject indicates difficulty in producing the tone on one side or the other, said indication will coincide with weakness of the vocal cord on the side opposite the side where difficulty is experienced.

9. A method for voice evaluation having three analysis steps as described in claim 1, further comprising:

requesting the subject to raise the arms above the head, grasp the elbows with opposing hands and squeeze the head to squeeze the vocal cords together, thereby giving greater clarity to the tone production problem.

10. A method for voice evaluation having three analysis steps as described in claim 1, further comprising:

requesting the subject to lie down in a supine position with arms at the sides with the head elevated approximately one to three inches and the lower legs and feet elevated approximately 18 to 24 inches so that the lumbar area of the subject's back may rest more easily on a substantially flat surface.

11. A method for voice evaluation having three analysis steps as described in claim 1, further comprising:

requesting the subject to lie down in a supine position with the arms placed above the head while grasping the elbows with opposing hands and squeezing the head to squeeze the vocal cords together; and elevating the subject's head approximately one to three inches while elevating the subjects lower legs and feet approximately 18 to 24 inches so that the lumbar area of the subject's back may rest more easily on a substantially flat surface.

12. A method for voice evaluation having three analysis steps as described in claim 1, further comprising:

requesting the subject to lie on one side, thereby opening the respiration system and decreasing restrictions in air flow;

whereby, when lying on the left side problems on the left vocal cord will become more prominent; and whereby, when lying on the right side, problems on the right vocal cord will become more prominent.

13. A method for voice evaluation having three analysis steps as described in claim 1, further comprising:

requesting the subject to lie prone with the stomach over the top of a resilient ball approximately 25 to 30 inches in diameter with arms at the sides.

14. A method for voice evaluation having three analysis steps as described in claim 1, further comprising:

requesting the subject to lie prone with the stomach over the top of a resilient ball approximately 25 to 30 inches in diameter with the arms placed above the head while grasping the elbows with opposing hands and squeezing the head to squeeze the vocal cords together.

15. A method for voice evaluation having three analysis steps as described in claim 1, further comprising:

requesting the subject to stand and bend over, placing the hands on the floor approximately two to three feet in front of the feet with the legs straight or slightly bent with the heels pressing downwardly, the hands and feet approximately shoulder width apart with the head pressed toward the knees.

* * * * *